Figure 1:
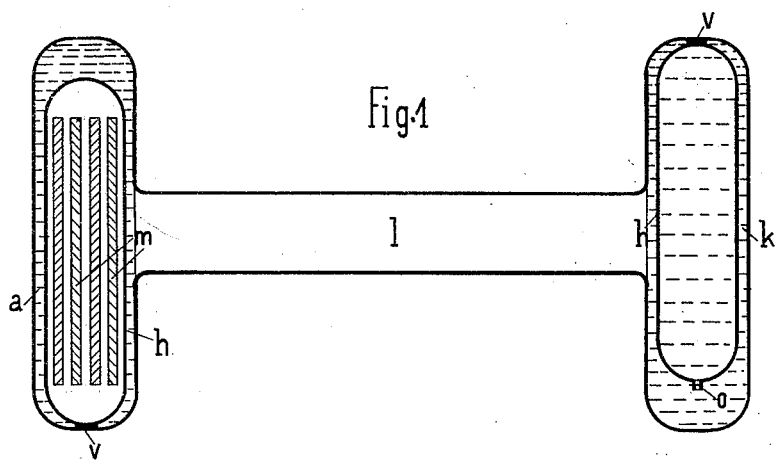

R. KÜCH.
MERCURY VAPOR LAMP.
APPLICATION FILED FEB. 3, 1910.

1,095,175.   Patented Apr. 28, 1914.

UNITED STATES PATENT OFFICE.

RICHARD KÜCH, OF HANAU, GERMANY, ASSIGNOR, BY MESNE ASSIGNMENTS, TO GENERAL ELECTRIC COMPANY, A CORPORATION OF NEW YORK.

MERCURY-VAPOR LAMP.

1,095,175.   Specification of Letters Patent.   Patented Apr. 28, 1914.

Application filed February 3, 1910.   Serial No. 541,743.

*To all whom it may concern:*

Be it known that I, RICHARD KÜCH, a subject of the German Emperor, and resident of Hanau o. M., Germany, have invented certain new and useful Improvements in Mercury-Vapor Lamps, of which the following is a specification.

Mercury vapor lamps, such, for instance, as those made of quartz, in which a large amount of electrical energy is consumed within a comparatively restricted space, require comparatively large electrode chambers for the purpose of obtaining a sufficiently large current, because, other things being equal, the greater the current intensity the larger the electrode chambers and the greater the amount of heat radiated from the exteriors of these chambers. Large electrode chambers require large quantities of mercury to fill them and large quantities of mercury have the disadvantage that the transport of vacuous glass vessels containing large quantities of mercury is very difficult, as the unavoidable tilting and jarring of the lamps during transportation causes many of them to be broken by the hammer blow action of the mercury.

The object of my invention is to obviate this disadvantage and improve the lamp, and in accordance with my invention I arrange within the electrode chambers massive bodies which, without thereby decreasing the outer wall surface of the electrode chambers which radiate the heat, enable the amount of mercury fluctuating inside the lamps, and the space which it occupies, to be greatly reduced. To introduce into the electrode chambers glass rods, or closed hollow glass vessels, is not practical, because the heat conducting power of glass is very much less than that of the mercury, and therefore the dissipation of the heat would be very limited. To place in the mercury vessels rods, or balls, of metal, or other substance, not attacked by mercury, such, for instance, as iron, or carbon, is objectionable because, especially in lamps which work under high loads, in course of time gases are evolved which impair the vacuum.

The object in view is attained and the quantity and mobility of the mercury is reduced without affecting the radiation of the heat, or using injurious substances, in accordance with my invention as follows:—

Into each of the electrode chambers is introduced one or more hollow receptacles of glass (preferably quartz glass) filled with solid metal, such as copper, or with liquid metal such as mercury. The said glass vessel, or vessels, can be fused into the inner wall of, or they may be loosely arranged in, the electrode chambers, but in such manner that they remain in position inside the electrode chambers so that when the position of the lamps is suddenly altered, the said hollow vessel, or vessels, cannot produce injurious blows on the electrode chambers. By the use of hollow vessels thus filled, the dissipation of the heat is not impaired, but on the contrary is improved if such vessels are filled with metal, such as copper, which has a good conducting power for heat. The arrangement of several hollow vessels of this kind has also the advantage that if it happens that, during transport, the mercury has run to one side of the lamp, and a sudden alteration of the position of the lamp causes the mercury to rush forward to the other side, the blow on the walls of the lamp will be greatly lessened because the narrow empty spaces formed between the hollow vessels or bodies, allow the mercury to pass through but slowly and reduce the blow. If the filling of the inclosed hollow vessels consists of metal which is attacked by mercury, the hollow bodies must of course be closed and should be fused to the pole vessel. If, however, mercury be used as the filling material, it will be sufficient to seal the hollow vessel, or vessels, to such extent that only a fine opening is left. The latter arrangement has the advantage that the hollow bodies can be evacuated at the same time as the lamp. The mercury inside the hollow vessel, or vessels, which has communication with the outer space inside the lamp through the small opening, does not participate in the violent movements in which the outer mercury is subjected during transport. If, however, during transport, one of the vessels filled with mercury be partly emptied and the mercury be thrown forward by violent movement against the side on which such a partly filled hollow vessel lies, the small opening operates as a safety valve.

Figure 2:
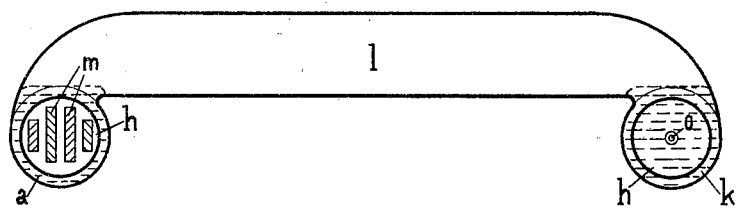

In the accompanying drawing, Figures 1 and 2 are two diagrammatic longitudinal views at right angles to each other of a lamp constructed in accordance with this invention.

$l$ is the illuminating tube, $a$ the anode chamber and $k$ the cathode chamber.

$h$ is a hollow vessel which is fused, at $v$, to the glass wall of the interior of both the cathode vessel and the anode vessel. In the drawing we have shown examples of two kinds of hollow glass vessels $h$ and contents, but they may, of course, if desired, be alike at each end. The hollow vessel $h$ in the cathode vessel is shown as being filled with mercury and as having a fine orifice at $o$, and the hollow vessel $h$ in the anode vessel is shown as being filled with metal rods $m$ and completely closed.

As aforesaid, instead of a single hollow vessel, several such vessels may be used on each side and these may, if desired, be loose in the electrode chambers.

As mercury current rectifiers have essentially the same construction and arrangement as mercury lamps it is a matter of course that the present invention may also be applied to them.

I claim:

1. A vapor electric apparatus comprising a frangible container having an electrode chamber, a body of mercury in said chamber and a heat conducting mass positioned to displace some of said mercury while leaving an unrestricted passage between the wall of the container and said mass, and an envelop of vitreous material for said mass.

2. The combination with a vapor electric device, having a frangible envelop and at least one mercury electrode, a separate vessel of vitreous material having substantially the shape of the portion of said envelop containing the mercury and arranged therein to leave a passage for the flow of mercury when the device is tilted and a heat-conducting mass in said vessel.

3. The combination with a mercury apparatus, of a tubular glass receptacle corresponding in form substantially to a mercury chamber of the apparatus, said receptacle being rigidly supported within such chamber and adapted to prevent sudden movement of any considerable body of mercury to or from said chamber, and mass of metal within said receptacle.

4. In a mercury vapor apparatus, the combination of a frangible vessel having electrode chambers containing mercury, and glass receptacles containing a heat conductive mass, said receptacles being positioned in said chambers to obstruct violent movements of the mercury and thereby prevent destructive impact on the walls of said apparatus, while leaving a free passage for the flow of mercury to and from the electrode chambers.

5. The combination with a mercury vapor apparatus, of a tubular receptacle arranged within a mercury chamber of the apparatus and extending across the passage connecting said chamber with the body of the apparatus to prevent sudden movement of any considerable body of mercury to or from said chamber, and a body of mercury within said receptacle.

6. The combination with a mercury vapor apparatus, of a tubular receptacle arranged within a mercury chamber of the apparatus and extending across the passage connecting said chamber with the body of the apparatus to prevent sudden movement of any considerable body of mercury to or from said chamber, said receptacle having a relatively small outlet communicating with the mercury chamber in which the receptacle is arranged, and a body of mercury within said receptacle.

7. The combination with a mercury vapor apparatus, of a tubular receptacle arranged within a mercury chamber of the apparatus and extending across the passage connecting said chamber with the body of the apparatus to prevent sudden movement of any considerable body of mercury to or from said chamber, said receptacle having a relatively small outlet communicating with the mercury chamber in which the receptacle is arranged, and out of alinement with the passage connecting said chamber with the body of the apparatus, and a body of mercury within said receptacle.

In testimony whereof I have signed my name to this specification in the presence of two subscribing witnesses.

RICHARD KÜCH.

Witnesses:
FRANZ HASSLACHER,
ERWIN DIPPEL.

Copies of this patent may be obtained for five cents each, by addressing the "Commissioner of Patents, Washington, D. C."